US005732547A

United States Patent [19]

Olsen et al.

[11] Patent Number: 5,732,547

[45] Date of Patent: Mar. 31, 1998

[54] JET ENGINE FAN NOISE REDUCTION SYSTEM UTILIZING ELECTRO PNEUMATIC TRANSDUCERS

[75] Inventors: Ronald F. Olsen, Woodinville, Wash.; Jeffrey M. Orzechowski, Windsor, Canada

[73] Assignee: The Boeing Company, Seattle, Wash.

[21] Appl. No.: 653,138

[22] Filed: May 24, 1996

Related U.S. Application Data

[63] Continuation of Ser. No. 322,804, Oct. 13, 1994, abandoned.

[51] Int. Cl.[6] .............................. F02C 7/24; F02C 7/045

[52] U.S. Cl. ........................... 60/204; 60/226.1; 415/119

[58] Field of Search .................................. 60/204, 226.1, 60/725, 39.29; 415/119

[56] References Cited

U.S. PATENT DOCUMENTS

| | | | |
|---|---|---|---|
| 3,245,219 | 4/1966 | Warden et al. | 60/39.29 |
| 3,572,960 | 3/1971 | McBride | 415/119 |
| 3,693,749 | 9/1972 | Motsinger et al. . | |
| 3,936,606 | 2/1976 | Wanke | 415/119 |
| 4,044,203 | 8/1977 | Swinbanks . | |
| 4,199,295 | 4/1980 | Raffy et al. . | |
| 4,255,083 | 3/1981 | Andre et al. | 60/226.1 |
| 4,419,045 | 12/1983 | Andre et al. | 415/119 |
| 4,557,106 | 12/1985 | Williams et al. | 60/725 |
| 4,677,676 | 6/1987 | Eriksson . | |
| 4,677,677 | 6/1987 | Eriksson . | |
| 4,715,559 | 12/1987 | Fuller . | |
| 4,736,431 | 4/1988 | Allie et al. . | |
| 4,815,139 | 3/1989 | Eriksson et al. . | |
| 4,837,834 | 6/1989 | Allie . | |
| 4,934,483 | 6/1990 | Kallergis . | |
| 5,022,082 | 6/1991 | Eriksson et al. . | |
| 5,033,082 | 7/1991 | Eriksson et al. . | |
| 5,082,421 | 1/1992 | Acton et al. | 415/119 |
| 5,119,902 | 6/1992 | Geddes . | |
| 5,157,596 | 10/1992 | Alcone . | |
| 5,216,722 | 6/1993 | Popovich . | |
| 5,221,185 | 6/1993 | Pla et al. . | |
| 5,222,148 | 6/1993 | Yuan . | |
| 5,386,689 | 2/1995 | Bozich et al. | 60/39.33 |

OTHER PUBLICATIONS

Preliminary Experiments on Active Control of Fan Noise From a JT15D Turbofan Engine, Nov. 1991.

*Primary Examiner*—Timothy Thorpe
*Assistant Examiner*—Ted Kim
*Attorney, Agent, or Firm*—Conrad O. Gardner

[57] ABSTRACT

A jet engine fan noise reduction system. The noise reduction system includes active noise control to suppress fan tone noise of an airplane flyover noise signature. The active noise control includes microphones with acoustic transducers upstream and downstream of the engine fan and fan exit guide vane stage to sense control system errors. Control signals are derived from the fan angular speed or blade passing frequency and the error signals sensed by the acoustic transducers. The control output signals actuate (modulate) air control valves on each side of the fan stage to direct conditioned (pressure and temperature regulated) high pressure primary air flow, thereby producing acoustic canceling of fan tone noise.

6 Claims, 1 Drawing Sheet

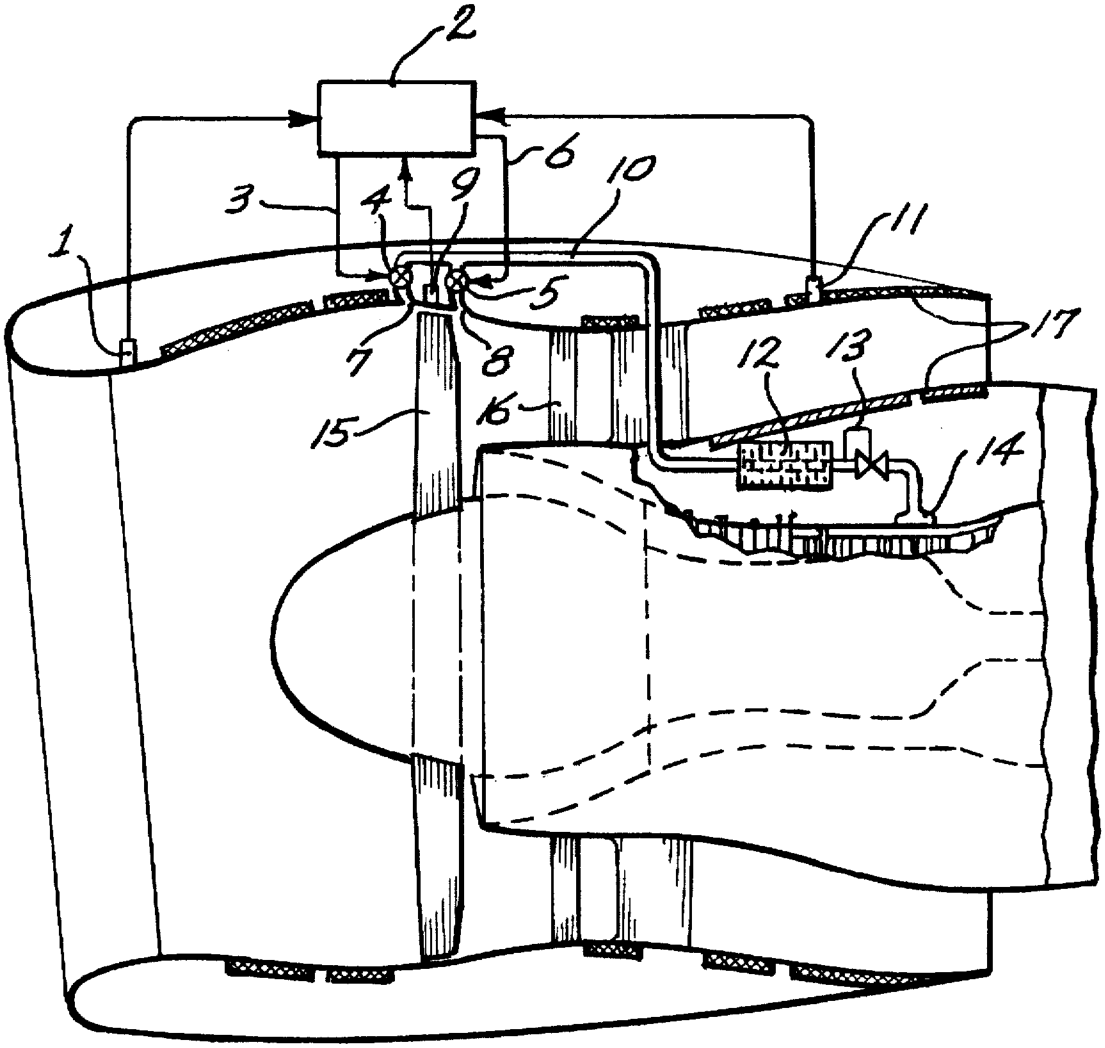
2
6
10
3
4
9
11
1
5
17
7
8
12
13
15
16
14

JET ENGINE FAN NOISE REDUCTION SYSTEM UTILIZING ELECTRO PNEUMATIC TRANSDUCERS

This application is a continuation of prior application Ser. No. 08/322,804, filed Oct. 13, 1994, abandoned.

FIELD OF THE INVENTION

This invention relates to jet engine fan noise reduction and more particularly to apparatus and methods for jet engine fan noise reduction using active noise control for actuating electro pneumatic transducers driven by high pressure air derived from the engine bleed air system.

BACKGROUND OF THE INVENTION

Exemplary of prior art in the patent literature technology are U.S. Pat. No. 4,044,203 to Swinbank which concerns reduction of noise in an aircraft bypass engine. Active noise control (ANC) is applied using destructive acoustic attenuation, and it is applied to the inlet flow area forward of the fan, and the exit nozzle flow area. In the engine inlet, U.S. Pat. No. 4,044,203 requires a minimum of three circumferential arrays of sound sources (speakers) positioned forward of three circumferential arrays of sound detectors (microphones), plus three detector arrays forward of three sound source arrays in the exit nozzle section. The system of U.S. Pat. No. 4,044,203 implies electromagnetic devices which carry a comparative weight penalty in contrast to a preferred embodiment of the present invention which powers the cancellation source electro-pneumatically from the engine compressor stages.

U.S. Pat. No. 4,934,483 to Kallergis which applies destructive acoustic attenuation to propeller-driven, four-stroke, piston engine airplanes. No control system is required, and phasing of the destructive acoustic pressure from the propeller blade is a function of engine speed, number of cylinders, and number of propeller blades. U.S. Pat. No. 5,216,722 to Popovich relates to a control system for a multi-channel active acoustic attenuation system for attenuating complex correlated sound fields. U.S. Pat. No. 5,119,902 to Geddes adapts ANC to reduce automotive exhaust noise, as does the system shown in U.S. Pat. No. 5,222,148 to Yuan, but the latter system responds also to engine vibration and shows a control system with adaptive filtering. U.S. Pat. No. 5,221,185 to Pla, et al. relates to synchronization of two or more rotating systems, such as twin engines on a propeller driven airplane.

Exemplary of literature prior art noise control systems are:

(1) "Active Noise Control Cuts Aircraft Emissions", Michael Mecham/Bonn, *Aviation Week & Space Technology*, Nov. 2, 1992.

(2) "Preliminary Experiments on Active Control of Fan Noise From a Jt15d Turbofan Engine", R. H. Thomas, R. A. Burdisso, C. R. Fuller, and W. F. O'Brien, Department of Mechanical Engineering Virginia Polytechnic Institute and State University, Blacksburg, Va., undated letter to the Editor; and (3) "Adaptive Signal Processing", Bernard Widrow/Samuel D. Sterns, Prentice-Hall, 1985, (Chapter 6).

Accordingly, it is an object of the present invention to provide acoustic canceling of fan tone noise utilizing control system output signals actuating electro pneumatic acoustical transducers driven by high pressure air instead of loudspeakers.

SUMMARY OF THE INVENTION

Current production airplanes satisfy FAR Stage III noise level requirements but anticipated Stage IV rules and local airport noise curfew legislation will probably require further development of noise reduction technology. The present noise control system continues the use of sound absorbent materials in the inlet and exhaust region, but includes active noise control to suppress fan tone noise which can be the dominant source of airplane flyover noise signature. The present active noise control differs significantly from prior art approaches in upstream and downstream of the fan and fan exit guide vane stage to sense control system errors. The present system operates with a reference signal derived from fan angular speed or blade passing frequency and error signals sensed by the acoustic transducers located in the inlet and from exhaust ducts. The output signal(s) actuate air control valves on each side of the fan stage which direct a cooled high pressure air flow to produce acoustic canceling of fan tone noise. Electro pneumatic transducers eliminate the weight penalty of electromagnetic devices and signal amplifiers. Additionally, because of "blade passage frequency" tone reduction, there is potentially further weight reduction and performance gains by reducing the number of fan exit guide vanes (currently the fan exit guide vane count is selected to minimize interaction noise between the fan and the exit guide vanes).

BRIEF DESCRIPTION OF THE DRAWING

FIG. 1 is a jet engine and nacelle cross section sharing a system block diagram including component locations.

DESCRIPTION OF THE PREFERRED EMBODIMENT

As herein before referenced (see literature prior art references (1) and (2)) several successful application of the use of active noise cancellation techniques to cancel sound radiated from airplane engines has been demonstrated, however, the preferred embodiment of the present invention hereinafter described utilizes proven noise cancellation concepts to overcome shortcomings of prior attempts to cancel jet-engine fan noise.

PRIOR ATTEMPTS TO SOLVE THE PROBLEM; WHY THEY FAILED

A German Research establishment DLR, has demonstrated the feasibility of using a propeller airplanes exhaust sound to cancel sound radiated from the propellant (see literature reference (1)). This was achieved by varying the phase of the propeller relative to the engine exhaust via an adjustable flange mounted on the propeller crankshaft. This method fails for application to jet engines because there is no harmonically related exhaust sound to couple with the inlet fan sound.

NASA funded work by C. R. Fuller et al. has demonstrated that out-of-phase sound generated by several loudspeakers mounted in the inlet of a jet engine can cancel sound radiation due to the inlet fan of a JT15D engine (see literature reference (2)). From a production point of view, this method fails for two main reasons.

(1) The size and weight of the twelve electromagnetically driven loudspeaker and power amplifiers, required to achieve the sound power levels required, make this method prohibitive.

(2) Since the directivity of the loudspeaker control sources differ from that of the Blade Passage Frequency (BPF) tone, the geometrical size of sound reduction near the control microphone is very small. Also, the sound level with the control system "on" increased at small distances from the control microphone.

THESE SHORTCOMINGS MAY BE OVERCOME BY THE USE OF THE SYSTEM OF THE PRESENT INVENTION DESCRIBED BELOW

The present system utilizes two concepts which were proven in literature references (1) and (2). These are:

(1) The use of an airplane engines exhaust to provide a means for obtaining a canceling sound source.

(2) The use of multiple canceling sources to reduce sound radiated from a jet engine inlet fan.

For Active Noise Control, using a conventional adaptive feed-forward system, to take place three things must happen.

(1) The "reference" signal x(t) must be sensed (2) The "error" signal e(t) must be sensed (3) The control output signal y(t) must be derived and output to an actuator in order to continuously minimize the error signal e(t).

The present system utilizes such a system, described in detail in literature reference (3), in the following manner.

The reference signal, x(t), is an input signal to the control system which is highly correlated to the offending noise source to be canceled. In this case the reference signal may be derived from a lightweight blade passage sensor mounted in the fan casing. The reference signal may also be derived from the engine tachometer signal.

The error signal e(t) is also an input to the control system and is a measure of the quantity to be minimized. In this case the error signal is a voltage signal from a microphone, or multiple microphones, placed in the engine inlet and/or outlet duct(s).

The control output signal y(t) can be derived from the error and reference signals using a version of a Least Mean Squares (LMS) algorithm. This control output signal is used to actuate an airflow controlling valve (modulating high pressure air) which produces a high level acoustic canceling signal. The air being fed to the controlling electro pneumatic transducers is regulated by a pressure regulating valve in order to insure that a usable amount of pressure is supplied to the electro pneumatic transducers.

ASSUMPTION

Sound is radiated forward, through the inlet duct and aft through the engine and out the exhaust duct. Therefore, the two largest Noise Sources are:

(1) Direct fan noise (2) Noise from the wakes from the fan as they impinge on the fan exit guide vanes The present system shown in FIG. 1 uses electro pneumatic transducers driven by high pressure air in place of conventional loudspeakers to provide the cancellation sources. This high pressure air to drive the canceling sources is derived from the engine bleed air system off of the high or low pressure compressors.

The use of this strategy for sensing is advantageous for the following reasons:

(1) The Blade Passage Frequency (BPF) tone will be reduced (2) The number of fan exit guide vanes may be reduced as a consequence of using this technique.

SYSTEM DESIGN CONSIDERATIONS (a) The present system may require one of these pairs of ports for each fan blade (only one such pair is shown on FIG. 1). These ports would be equally spaced around the circumference of the fan.

(b) It may be possible to eliminate electronic controller 2 and use a mechanical type configuration such as shown in literature reference 1.

(c) The present system may only utilize one control output transducer instead of two. In effect, one control output transducer may be able to sufficiently reduce both the initial propagating wave as well as the wave due to the fan exit guide vanes.

(d) It may be advantageous to use multiple error microphones instead of one single error microphone at each of the ducts ($E_1$ and $E_2$) in order to optimize the directivity of the sound reduction.

While observing the present system configuration as shown in FIG. 1, a reading of the following component list in conjunction with the associated functional relationship of the component in the system will lead the reader to a clear understanding of the structure and operation of the preferred embodiment of the present invention.

| Component | Function |
|---|---|
| 1. Error microphone ($E_1$) | senses acoustical propagating wave so as to be minimized via Control Output Transducers 4 and 5 |
| 2. Control Unit | accepts signals from input sensors (X, $E_1$, and $E_2$) and supplies control output signals ($Y_1$ and $Y_2$) |
| 3. Control Signal $Y_1$ | used to modulate high pressure air in order to produce controlling sound source |
| 4. Control output transducer | source of canceling wave due to fan 15 (electro pneumatic transducer) |
| 5. Control output transducer | reduce wakes as they are formed by fan exit guide vanes 16 |
| 6. Control signal $Y_2$ | used to modulate high pressure air in order to produce controlling noise source |
| 7. waveguide | directs cancellation output sound wave from control output transducer 4 |
| 8. waveguide | directs cancellation output sound wave from control output transducer 5 |
| 9. reference sensor (X) | supplies reference input to synchronize controller so as to ensure optimal reduction |
| 10. supply duct | supplies high pressure air for electro pneumatic transducers |
| 11. error microphone ($E_2$) | senses acoustical wave propagating through engine to be minimized via control output transducers |
| 12. heat exchanger | cools high temperature gas to be injected |
| 13. pressure regulator | maintains somewhat constant pressure to supply transducers (4 and 5) |
| 14. bleed port | port for high pressure air to supply electro pneumatic cancellation transducers |
| 15. fan | used to move air through engine and is a primary noise source |
| 16. fan exit guide vanes | used to straighten fan exhaust airflow and is also a primary source of noise due to wake interactions as well as acoustical wave reflections from fan (15) |
| 17. acoustic treatment | absorb noise |

What is claimed is:

1. In combination in a system for jet engine fan stage noise reduction:

a reference sensor X;

an error microphone E1;

an error microphone E2;

a control unit responsive to said reference sensor X, said error microphone El, and said error microphone E2 for providing control signal Y1, and control signal Y2;

said control signal Y1 controlling said electro pneumatic transducers which modulate conditioned high pressure air to produce a modulated sound source;

said control signal Y2 controlling said electro pneumatic transducers which modulate conditioned high pressure air to produce a modulated sound source;

waveguides for directing sound waves and airflow from said electro pneumatic transducers to a fan blade tip region on each side of the fan stage:

a pressure regulator to condition high pressure air from an engine compressor for said electro pneumatic transducers;

a heat exchanger to condition the high temperature air from the engine compressor for said electro pneumatic transducers;

supply ducts for transporting engine compressor air to the said pressure regulator and said heat exchanger and conditioned compressor air to the said electro pneumatic transducers; and at least one bleed port located on the engine compressor's case for extracting high pressure air to supply electro pneumatic transducers.

2. The combination according to claim 1 further including reference sensor X for providing reference input to synchronize said control unit.

3. The combination according to claim 2 further including acoustic treatment located on flow surfaces ahead of and behind the fan to attenuate fan noise which is not canceled by the modulated conditioned high pressure air leaving the said wave guides.

4. A system for jet engine fan stage noise reduction comprising in combination:

an active noise control system including a plurality of microphones and electro pneumatic transducers upstream and downstream of the fan stage of the jet engine, said microphone sensing control system errors:

said active noise control system further including a reference signal from the fan, and error signals sensed by said microphones for providing control output signals; and, said control output signals actuating electro pneumatic transducers located on each side of the fan stage, to modulate conditioned high pressure air flow to each side of the fan stage by way of waveguides; and said waveguides directing the modulated and conditioned high pressure air flow to a region of a fan tip, thereby producing acoustic canceling of fan noise; and a system for conditioning high pressure and temperature engine compressor air for said electro pneumatic transducers consisting of:

a pressure regulator to condition the high pressure air from the engine compressor for said electro pneumatic transducers;

a heat exchanger to condition the high temperature air from the engine compressor for said electro pneumatic transducers;

supply ducts for transporting engine compressor air to said pressure regulator and said heat exchanger and conditioned compressor air to the said electro pneumatic transducers.

5. The system according to claim 4 further including said acoustic treatment to reduce fan broadband noise and fan tone noise which is not canceled by the electro pneumatic transducers.

6. In a jet engine having a fan stage, a method for control of jet engine fan noise comprising the steps of:

providing output control signals in response to a signal representative of blade passing frequency; and, utilizing said output control signals to actuate electro pneumatic transducers on each side of said fan stage to direct by way of waveguides conditioned and modulated high pressure air flow to a region of the fan blade tip on both the upstream and downstream sides of the fan stage; and conditioning air from an engine compressor for effective use with said electro pneumatic transducers comprising the steps of:

ducting engine compressor bleed air from at least one port mounted on the engine compressor's case through a supply duct to a pressure regulator for the purpose of controlling the supply pressure to said heat exchanger and said electro pneumatic transducers;

ducting the pressure regulated compressor air leaving said pressure regulator through a supply duct to said heat exchanger for reducing and controlling the temperature of the supply air pressure for said electro pneumatic transducers; and ducting the conditioned high pressure air through a supply duct to said electro pneumatic transducers.

* * * * *